US005602710A

United States Patent [19]

Schmidt et al.

[11] Patent Number: 5,602,710

[45] Date of Patent: Feb. 11, 1997

[54] SURGE ARRESTER

[75] Inventors: Walter Schmidt, Bellikon; Christoph Schüpbach, Dietikon, both of Switzerland

[73] Assignee: ABB Management AG, Baden, Switzerland

[21] Appl. No.: 656,853

[22] Filed: May 30, 1996

Related U.S. Application Data

[63] Continuation of Ser. No. 292,272, Aug. 18, 1994, abandoned.

[30] Foreign Application Priority Data

Sep. 6, 1993 [CH] Switzerland .......................... 2640/93

[51] Int. Cl.$^6$ .......................... H02H 9/04; H01C 7/12; H01C 8/04

[52] U.S. Cl. .......................... 361/127; 361/117

[58] Field of Search .......................... 361/117–119, 126, 361/127, 131

[56] References Cited

U.S. PATENT DOCUMENTS 4,853,670 8/1989 Stengard .......................... 361/126

4,930,039 5/1990 Woodworth et al. .......................... 361/127

5,043,838 8/1991 Sakich .......................... 361/117

5,291,366 3/1994 Giese et al. .......................... 361/127

FOREIGN PATENT DOCUMENTS 0545038 6/1993 European Pat. Off. .

*Primary Examiner*—Brian K. Young
*Assistant Examiner*—Ronald W. Leja
*Attorney, Agent, or Firm*—Burns, Doane, Swecker & Mathis, L.L.P.

[57] ABSTRACT

A surge arrester includes at least two connection fittings and a one-piece frame, the frame holding the connection fittings. The frame is formed of an insulating material. The surge arrester includes at least one block of varistor material clamped between the connection fittings. The surge arrester further includes an insulating material in which the frame, the block of varistor material and at least part of the connection fittings are cast to form a monolithic body. An arrangement is provided for maintaining a contact force between the connection fittings and the block of varistor material.

13 Claims, 4 Drawing Sheets

SURGE ARRESTER

This application is a continuation of application Ser. No. 08/292,272, filed Aug. 18, 1994, now abandoned.

BACKGROUND OF THE INVENTION

1. Field of the Invention

The invention is based on a surge arrester.

2. Discussion of Background

EP-A1-0 545 038 discloses a surge arrester having two fittings braced against each other by axially slightly resilient plastic strips. The plastic strips are guided with a form fit in the fittings. The surge arrester has cylindrically designed varistor elements, arranged one on top of the other to form a stack. Provided between the stack and the respective connection fitting is a spacer plate, which is pressed against the stack by means of a threaded bolt screwed into the fitting. The fittings bound the stack of varistor elements. Between the varistor elements and between the varistor elements and the electrically conducting spacer plates there are provided grooved disks for improving contact making. The arrangement described is encapsulated in insulating material.

The production of such a surge arrester from comparatively many individual parts requires a comparatively large number of working steps during assembly. In particular, the plastic strips have to be fitted very accurately into their guides in the fittings.

SUMMARY OF THE INVENTION

Accordingly, one object of this invention, as it is characterized in the independent claim 1, is to provide a novel surge arrester which can be produced with comparatively few working steps from parts which are simple and inexpensive to fabricate.

The surge arrester has at least two connection fittings, held by a frame, with at least one block of varistor material clamped between the connection fittings. In the case of the surge arrester, the frame, the at least one block and, in part, the connection fittings are cast in an insulating plastic material to form a monolithic body. The frame is designed in one piece and is fabricated from an insulating material. In addition, means which maintain the contact force between the connection fittings and the at least one block of varistor material are provided. The advantages achieved by this invention are to be seen essentially in that the assembly of the surge arrester, in particular the installation of the active part, is made significantly more simple and less expensive.

Either at least one electrically conducting, resilient element, for example a wave washer, or a frame which is resilient in the axial direction is provided as the means which maintains the contact force between the connection fittings and the at least one block of varistor material. In this way it is ensured that adequate contact force prevails during the entire lifetime of the surge arrester.

The insulating material of the frame is fibre-reinforced, in particular glass fibre-reinforced, so that the frame can be subjected to high mechanical loads. A frame which can be subjected to particularly high mechanical loads is obtained if random fibers are used for the fiber reinforcement of the frame. 10 to 80 percent by weight of fibers are incorporated for the fiber reinforcement of the frame. If glass fibers are used as reinforcement, a proportion of 30 to 50 percent by weight of glass fibers has been found to be favorable.

The frame can be produced particularly inexpensively if it is injection-molded or extruded from a polymer material or is cast from epoxy resin. If appropriate, the frame may also be wound from at least one fiber-reinforced strand impregnated with epoxy resin. The connection fittings are advantageously designed as threaded pins. It has proved to be particularly advantageous to connect one of the threaded pins rigidly to the frame.

The grooved disks ensure that a multiplicity of contact points are formed, for satisfactory current transfer. In addition, these soft grooved disks advantageously compensate for any unevennesses of the block surface, so that these unevennesses cannot reduce the current-carrying capability. It proves to be particularly advantageous that the grooved disks at the same time also seal the current transfer zones of the surge arrester against the penetration of insulating material during the casting operation for applying the casing.

Any further refinements of the invention are subjects of the dependent claims.

The invention, its further development and the advantages which can be achieved thereby are explained in more detail below with reference to the drawing, which represents merely one possible embodiment.

BRIEF DESCRIPTION OF THE DRAWINGS

A more complete appreciation of the invention and many of the attendant advantages thereof will be readily obtained as the same becomes better understood with reference to the following detailed description when considered in connection with the accompanying drawings, wherein.

DESCRIPTION OF THE PREFERRED EMBODIMENTS

Figure 1:
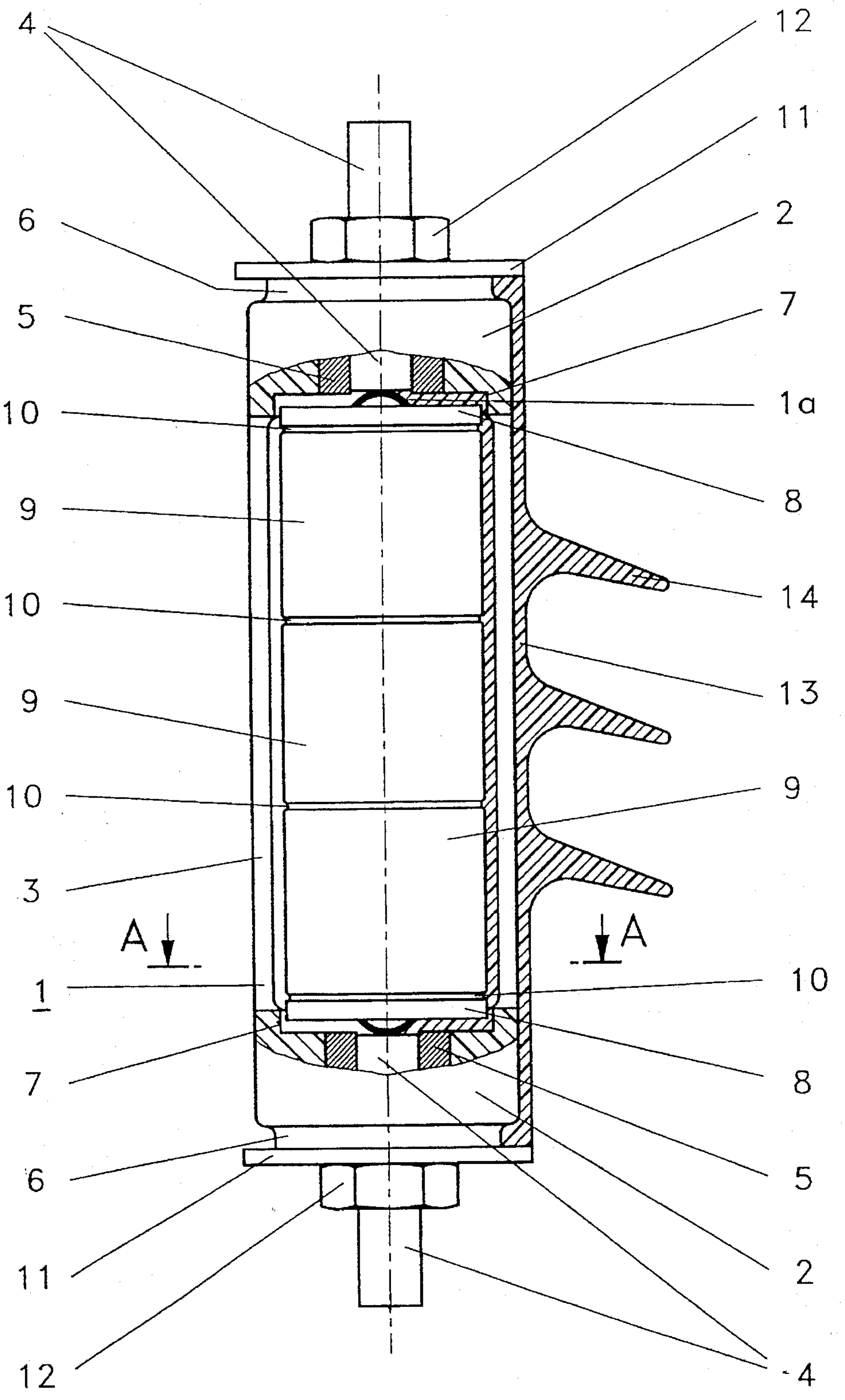
FIG. 1 shows a first partial section longitudinally through a first embodiment of the invention.
Figure 2:
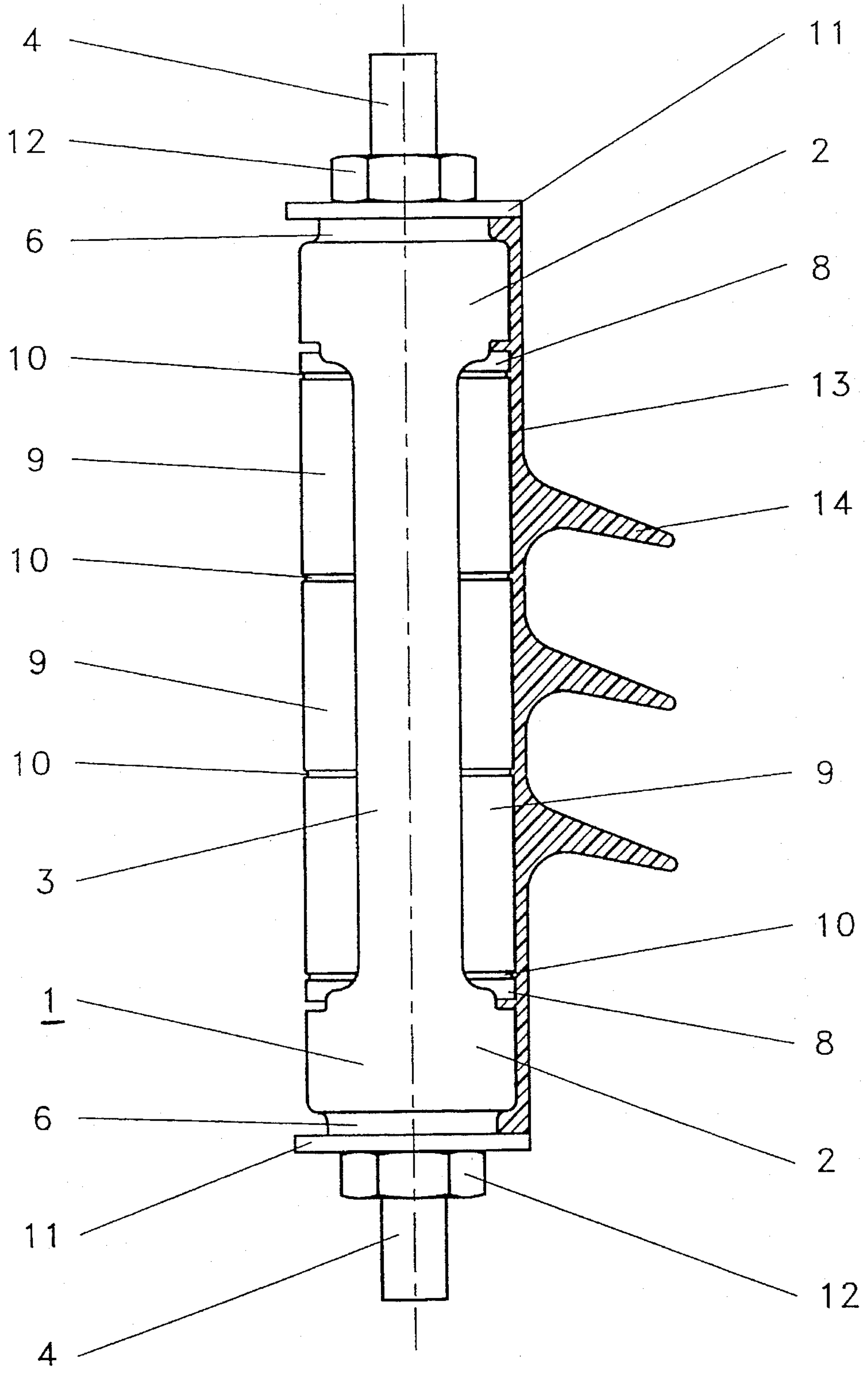
FIG. 2 shows a second partial section longitudinally through a second embodiment of the invention, FIGS. 3 to 6 respectively show a section A—A, as it is indicated in FIG. 1, through various possible embodiments of the invention.

Referring now to the drawings, wherein like reference numerals designate identical or corresponding parts throughout the several views, in FIGS. 1 and 2 a longitudinal section is shown in diagrammatic representation through a surge arrester according to the invention, the surge arrester according to FIG. 2 being turned through 90° about its longitudinal axis with respect to that of FIG. 1. In these figures, the right-hand half of the surge arrester is in each case shown already encapsulated in an insulating compound. The surge arrester has a closed frame 1 of a one-piece design, made of an insulating material which can spring somewhat in the axial direction. Should the frame 1 not spring or not spring sufficiently, at least one resilient, electrically conducting element is provided, for example a wave washer la. The frame 1 has in each case at its ends facing the two connection sides of the surge arrester an elliptically or cylindrically designed end piece 2. The two end pieces 2 are held together here by two molded-on and symmetrically opposing connecting parts 3. An axially extended threaded pin 4 is screwed in each case into the elliptically or cylindrically designed end pieces 2. The threaded pins 4 serve as connection fittings for the electrical connections of the surge arrester. Here, for example, there are recessed into the end pieces 2 metallic threaded inserts 5, which guide the threaded pins 4 in a threaded bore, but a variety of possible ways in which permanently secure threads can be introduced into plastic parts are known. For instance, the threads may also be cut directly into the plastic of the frame 1. A shoulder 6 is molded onto the end face of each of the end pieces 2. On the side of the end pieces 2 facing away from the end face there is provided in the region of the transitions from the respective end piece 2 to the connecting parts 3 a cylindrically designed recess 7, in which a metallic pressure plate 8 is guided with clearance. The threaded pin 4 acts in each case directly on this pressure plate 8 if the frame 1 has resilient connecting parts 3. If the connecting parts 3 do not spring, or not strongly enough, electrically conducting, resilient elements are introduced between the pressure plate 8 and the threaded pin 4. The use of wave washers 1*a* has been found to be particularly favorable here. These wave washers 1*a* may be fitted only on one side of the surge arrester or, if greater forces are required, also on both sides of the surge arrester. Cup springs or wound springs may also be used as resilient elements.

Clamped between the two pressure plates 8 are blocks 9 of varistor material, such as for example ZnO. The blocks 9 are generally of a cylindrical design. Inserted between the pressure plates 8 and the respectively next block 9 is a cylindrically designed grooved disk 10, which has a central bore, and similarly there is always a grooved disk 10 inserted between neighboring blocks 9. The threaded pins 4 act on the pressure plates 8, possibly via the wave washers 1*a*. When introducing the described parts into the frame 1, it must be ensured that no gaps into which insulating material could penetrate during casting remain open between the parts. The actual contact force between the active parts is produced by the threaded pins 4, which are tightened with a predetermined torque and are subsequently secured against twisting in one of the known ways. Subsequently, onto each of the threaded pins 4 there is pushed a sealing disk 11, the cross section of which is adapted to the end piece 2 and is of an elliptical or cylindrical design here. The sealing disk 11 is preferably produced from a weather-resistant aluminum alloy, such as for example AlMg3. The sealing disk 11 may be fabricated from stainless steel, brass or bronze. The sealing disk 11 is pressed against the end face of the frame 1 in each case by means of a nut 12 screwed onto the respective threaded pin 4. The sealing disk 11 is to seal the finished surge arrester against environmental effects. Together with the shoulder 6, the sealing disk 11 forms a groove, which is filled with electrically insulating plastic during encapsulation.

The thus preassembled arrangement is placed into a mold and encapsulated with a casing 13 of electrically insulating plastic, without any gaps or voids, up to the sealing disk 11. A suitable plastic for this is, for example, silicone rubber. During encapsulating, at the same time insulating shields 14 are molded onto the casing 13. The threaded pins 4 which are required for the electrical connections of the surge arrester remain as bare metal.

The frame 1 of the surge arrester is preferably produced from a glass fiber-reinforced nylon 6.6 in an injection-molded process, the proportion of glass fibers in this case lying in a range from 30 to 50 percent by weight. A particularly sturdy frame 1 is obtained if the glass fibers are incorporated as random fibers. Apart from the nylon 6.6 mentioned, nylon 610, nylon 11 and also nylon 12 may also be used for the production of the frame 1. Furthermore, it is possible also to use recycled products based on the polyamides mentioned, in particular whenever the surge arresters do not have to meet particularly high requirements for cantilever strength. The frame 1 may, however, also be machined from a corresponding solid material. It is also possible to wind the frame 1 with the aid of a resin-impregnated glass fiber filament or tape. In a normal case, the frame 1 is fabricated in the size adapted to the respective overall size of the surge arrester, so that no additional adapting work is necessary on the frame 1. In small series, however, it may prove to be necessary for reasons of cost-effectiveness to adapt the frame 1 to various overall sizes of the surge arrester. For this purpose it is possible to divide up the connecting parts 3 and lengthen them by corresponding intermediate pieces. However, these intermediate pieces must be inserted absolutely securely.

Figure 3:
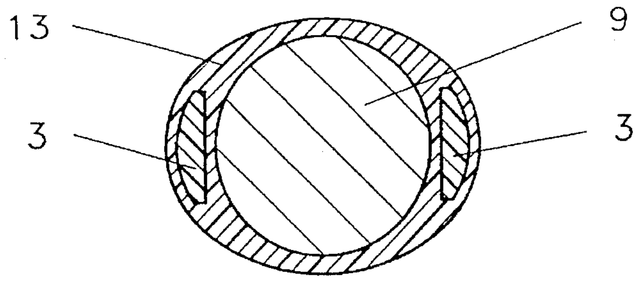
Figure 4:
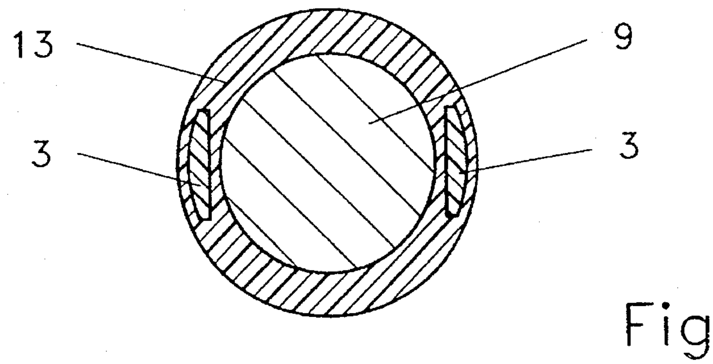
Figure 5:
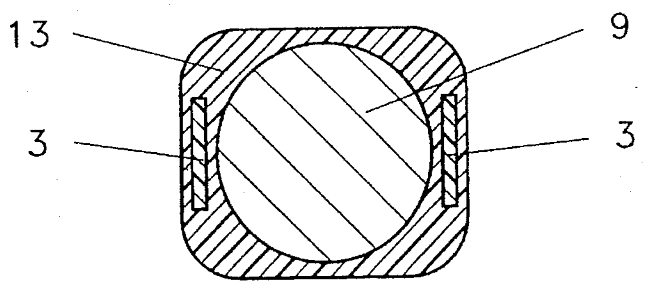
Figure 6:
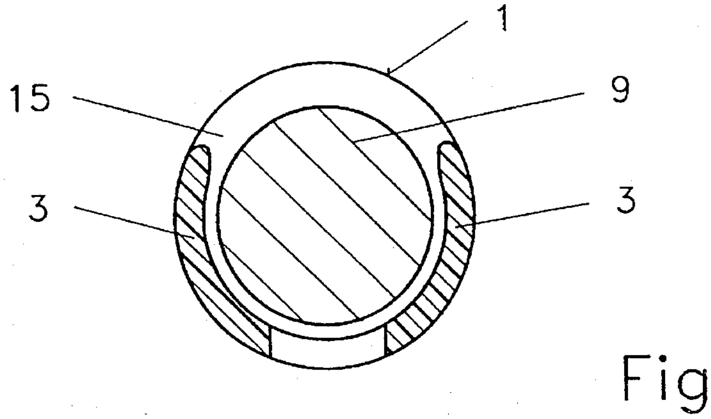

In FIG. 1 the section A—A is entered. FIGS. 3 to 6 show the section A—A, as it could appear in the case of various possible embodiments of the invention. In FIG. 3 there is shown, for example, an elliptically designed casing 13, which surrounds the blocks 9. In this case, the cross-sections of the connecting parts 3 are adapted to the shape of the casing 13. In FIG. 4 there is shown a cylindrically designed casing 13, which surrounds the blocks 9. In this case, the cross sections of the connecting parts 3 are adapted to the shape of the casing 13. In FIG. 5 there is shown a substantially rectangularly designed casing 13, which surrounds the blocks 9. In this case, the cross sections of the connecting parts 3 are adapted to the shape of the casing 13. In FIG. 6 there is shown an arrangement which has not yet been provided with a casing. In this case, the connecting parts 3 are arranged unsymmetrically, but such that the frame 1 has on the one side an opening 15 which allows the assembly of the blocks 9. This frame 1 is provided with a cylindrically designed casing 13, therefore the cross sections of the connecting parts 3 are also adapted here to the shape of the casing 13. Such a frame 1 is particularly torsion-resistant and is used for surge arresters which are designed for particularly high bending loads.

The grooved disk 10 has a central bore. A multiplicity of grooves surround this bore concentrically. The grooved disk is produced from soft-annealed aluminum. The outermost edge of the outermost grooves in each case serves as a sealing edge against plastic penetrating during casting. A variety of groove shapes can be imagined, but on the outside there must always be formed an adequate sealing edge and, moreover, it must be ensured that an adequate number of contact points for the electrical contact can form during the assembly of the grooved disks 10.

Figure 7:
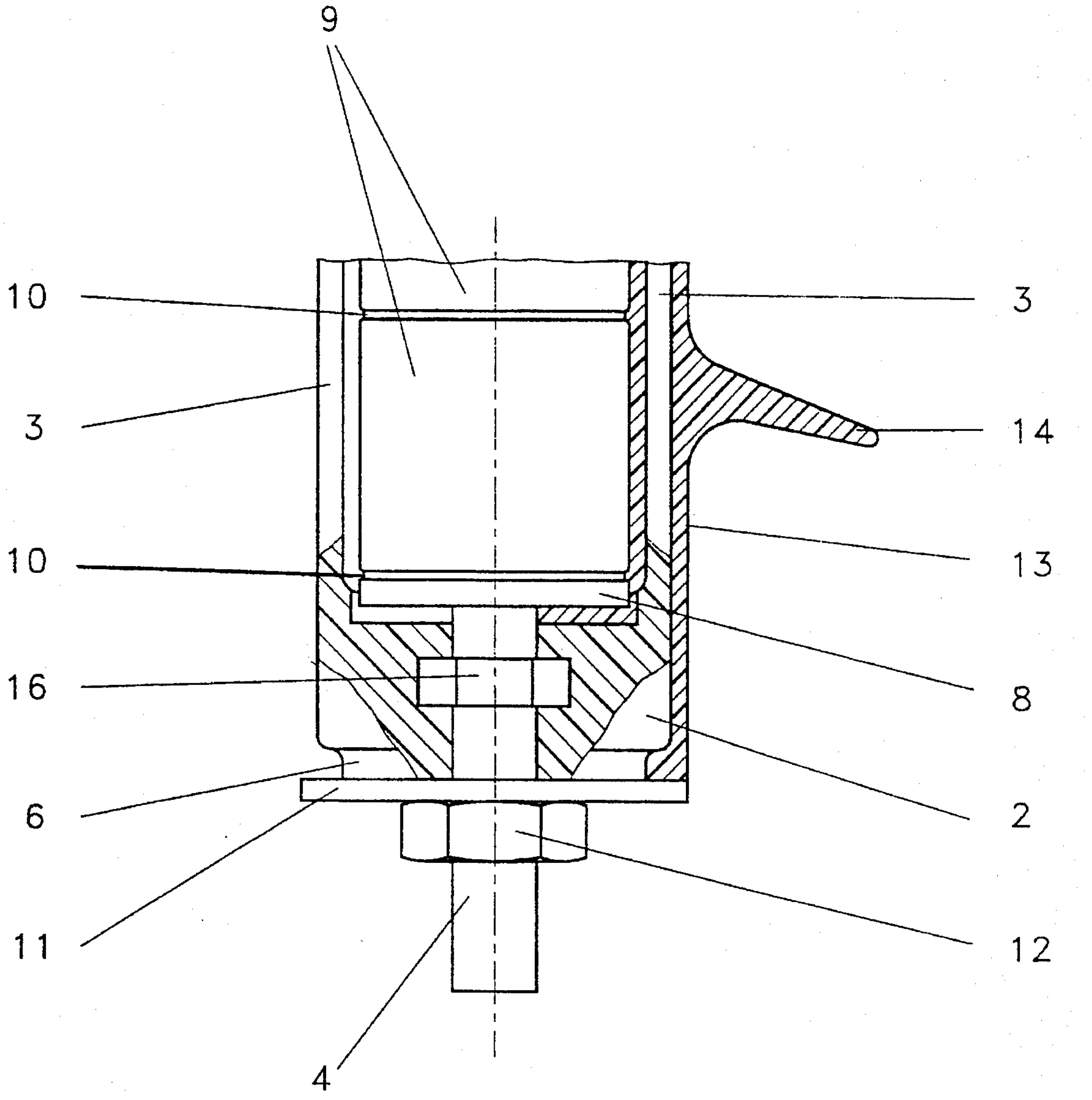
FIG. 7 shows a partial section through a further possible embodiment of the invention.

It can also be imagined that only one of the threaded pins 4 is used for producing the contact force, while the other is cast solidly with the frame 1 already during production of the latter, as shown in FIG. 7. This threaded pin 4 has a shaped piece 16, which is rigidly connected to it; this may be, for example, a nut adhesively bonded to it, the hexagon of which makes twisting of the threaded pin 4 in the frame 1 impossible. In this case, the contact force is produced by the opposite threaded pin 4 alone.

To explain the operating principle, the figures described will be considered in a little more detail. The contact force which is applied by the threaded pins 4 to the arrangement ensures that the edges of the grooved disks 10 deform locally, giving rise to defined punctiform contacts, which allow a particularly good current transfer in the surge arrester. The best current transfer is achieved if there are a multiplicity of such punctiform contacts, which are distributed uniformly over a surface area. The grooved disks 10 make possible this multiplicity of punctiform contacts. In this way it is ensured that the comparatively very high current flowing when the surge arrester responds is always discharged reliably through the active part of the surge arrester, without an overloading of certain places where there is current transfer and an associated scorching, which causes defects, being able to occur. The operational reliability of the arrester is considerably increased in this way.

Furthermore, it serves for operational reliability that the contact force mentioned is maintained over the entire lifetime of the surge arrester, since either the frame 1 springs somewhat in the axial direction, so that it expands somewhat during tightening of the threaded pins and maintains this prestressing, or additional resilient elements, such as the wave washers 1*a*, maintain the prestressing. An interaction between frame 1 and these resilient elements is also possible. This prestressing is chosen such that there is also reliable compensation at all times for any shrinking of the grooved disks 10.

It is advantageously ensured by the casting of the entire arrangement into the casing 13 and by the sealing disks 11 that both the blocks 9 and the frame 1 with the connecting parts 3 cannot absorb any moisture from the ambient air, so that their dielectric strength is not reduced. The monolithic body into which the finished surge arrester is formed has a high mechanical stability, in particular also with regard to cantilever strength, and in addition it is insensitive to decomposing climatic effects, so that it can be used advantageously in all climatic zones.

Obviously, numerous modifications and variations of the present invention are possible in light of the above teachings. It is therefore to be understood that, within the scope of the appended claims, the invention may be practiced otherwise than as specifically described herein.

LIST OF DESIGNATIONS

| LIST OF DESIGNATIONS | |
|---|---|
| 1 | Frame |
| 1a | Wave washers |
| 2 | End piece |
| 3 | Connecting parts |
| 4 | Threaded pin |
| 5 | Threaded insert |
| 6 | Shoulder |
| 7 | Recess |
| 8 | Pressure plate |
| 9 | Block |
| 10 | Grooved disk |
| 11 | Sealing disk |
| 12 | Nut |
| 13 | Casing |
| 14 | Screen |
| 15 | Opening |
| 16 | Shaped piece |

What is claimed as new and desired to be secured by Letters Patent of the United States is:

1. A surge arrester comprising:

at least two connection fittings;

a one-piece frame, the frame having a top end piece, a bottom end piece, and at least two connecting pans extending transversely relative to the top end piece and the bottom end piece and connecting the top end piece and the bottom end piece, the top end piece, the bottom end piece, and the at least two connecting parts forming a closed loop, the connection fittings being held in the top end piece and the bottom end piece of the frame, the frame being formed of an insulating material;

at least one block of varistor material clamped between the connection fittings;

an insulating material in which the frame, the at least one block of varistor material and at least part of the connection fittings are cast to form a monolithic body; and means for maintaining a contact force between the connection fittings and the at least one block of varistor material.

2. The surge arrester as claimed in claim 1, wherein the frame forms at least pan of the maintaining means, the frame being resilient in an axial direction such that tension of the frame in the axial direction maintains the contact force between the connection fittings and the at least one block of varistor material.

3. The surge arrester as claimed in claim 1, wherein the frame insulating material is fiber-reinforced.

4. The surge arrester as claimed in claim 3, wherein random fibers are used for fiber reinforcement of the frame.

5. The surge arrester as claimed in claim 3, wherein the frame insulating material includes a proportion of 10 to 80 percent by weight of the fibers for fiber reinforcement of the frame.

6. The surge arrester as claimed in claim 3, wherein the insulating material of the frame is glass-fiber reinforced.

7. The surge arrester as claimed in claim 6, wherein the frame insulating material includes a proportion of 30 to 50 percent by weight of glass fibers for glass fiber reinforcement of the frame.

8. The surge arrester as claimed in claim 1, wherein the frame is injection-molded or extruded from polymer material, or cast from epoxy resin.

9. The surge arrester as claimed in claim 1, wherein the connection fittings each include threaded pins.

10. The surge arrester as claimed in claim 9, wherein one of the threaded pins is connected rigidly to the frame.

11. The surge arrester as claimed in claim 1, wherein the frame is wound from at least one fiber-reinforced strand impregnated with epoxy resin.

12. The surge arrester as claimed in claim 11, wherein the strand is glass-fiber reinforced.

13. The surge arrester as claimed in claim 1, wherein the maintaining means includes one or more electrically conducting, resilient elements disposed between the connection fittings and the at least one block of varistor material for maintaining the contact force between the connection fittings and the at least one block of varistor material.

* * * * *